United States Patent [19]

Akpa

[11] Patent Number: 5,914,676
[45] Date of Patent: Jun. 22, 1999

[54] MULTI-LANGUAGE DISPLAY KEYPAD

[75] Inventor: Marcellin Akpa, San Diego, Calif.

[73] Assignees: Sony Corporation, Tokyo, Japan; Sony Electronics Inc., Park Ridge, N.J.

[21] Appl. No.: 09/010,941

[22] Filed: Jan. 22, 1998

[51] Int. Cl.[6] ............................................. H03M 11/00
[52] U.S. Cl. .......................... 341/23; 341/22; 345/170; 379/768
[58] Field of Search ....................... 341/22, 23; 345/170; 379/368

[56] References Cited

U.S. PATENT DOCUMENTS

| | | | |
|---|---|---|---|
| 4,459,581 | 7/1984 | Wilson | 340/365 VL |
| 5,007,008 | 4/1991 | Beers | 364/709.15 |
| 5,237,327 | 8/1993 | Saitoh et al. | 341/176 |
| 5,477,510 | 12/1995 | Ukita | 369/18 |
| 5,537,106 | 7/1996 | Mitsuhashi | 340/825.72 |
| 5,559,512 | 9/1996 | Jasinski et al. | 341/22 |
| 5,590,107 | 12/1996 | Chatani | 369/54 |
| 5,671,014 | 9/1997 | Ito | 348/239 |
| 5,818,361 | 10/1998 | Acevedo | 341/23 |

*Primary Examiner*—Michael Horabik
*Assistant Examiner*—Albert K. Wong
*Attorney, Agent, or Firm*—Crosby, Heafey, Roach & May

[57] ABSTRACT

A mobile phone keypad having a plurality of special function keys each of which is provided with an LCD screen for displaying the function of the key in one of a plurality of languages. The display data for the LCD screens is stored in a PROM and a microprocessor reads out the display data in a selected language for all of the function keys at the same time.

10 Claims, 2 Drawing Sheets

MULTI-LANGUAGE DISPLAY KEYPAD

BACKGROUND OF THE INVENTION

1. Technical Field

This invention pertains to a telephone keypad and more particularly to a mobile phone telephone keypad having universal language capabilities.

2. Background Art

Some current telephone keypads, particularly cellular or PCS mobile phone keypads, have ten alpha/numeric keys, e.g. a key with "2ABC", "3DEF", etc., and a plurality of special purpose keys, e.g. a key to cause the phone to place or answer a call, e.g. a "TALK" or "SEND" key, to initiate a a call, an "END" key to end a call, a "STORE" key to store entered numbers into a memory, a "RECALL" key to recall stored numbers, a "CLEAR" key to erase numbers which have been previously entered, etc.

While the alpha/numeric keys are universally understood regardless of the language spoken by a user of the phone, the special function keys must be specially labeled in the language of the user to be understood. This entails a significant burden on the manufacturer to relabel the special purpose keys for each country in which the phone is to be sold. Further, it may occur that a particular phone user in a given country, e.g. the United States, may wish to have a phone which is labeled in a minority language of that country, e.g. Spanish. What is needed is an economical and convenient way to relabel the special purpose keys.

SUMMARY OF THE INVENTION

The above discussed problem of providing special purpose phone keys in multiple languages is overcome by the present invention which comprises a mobile phone keypad comprising a plurality of keys, some having fixed labels thereon for describing a function of the key and others having changeable labels thereon for describing a function of the key, each changeable label including a liquid crystal display (LCD) screen, storage means for storing display information in a plurality of different languages for the LCD screens, LCD driver means for simultaneously supplying display signals to the LCD screens to cause the LCD screens to display different displays in the same language, and control means connected to each of the plurality of keys for sensing when one of such keys is depressed and controlling a corresponding function of the mobile phone in response thereto. The control means controls the storage means and the LCD driver means to read out display information in a given language from the storage means and supply the read out display information to the LCD driver means.

The control means can be programmed by a user of the mobile phone by depressing one or more of the plurality of keys. The control means can be thereby controlled by the user to read out the display information in a language selected by the user from the storage means and supply the read out display information to the LCD driver means. Typically, one of the plurality of keys having a keypad with a changeable label is a "CLEAR" key for causing the mobile phone to erase a number or a series of numbers entered by means of the keys or a "STORE" key for causing the mobile phone to store in a memory a number or a series of numbers entered by means of the keys. Still other special purpose keys having a changeable label are a "RECALL" key for causing the mobile phone to read out from memory a number or a series of numbers previously stored in the memory, a "SEND" key for causing the mobile phone to dial a number, and an "END" key for causing the mobile phone to disconnect voice communication with another phone.

BRIEF DESCRIPTION OF THE DRAWINGS

The aforementioned advantages of the invention, as well as additional advantages thereof, will be more fully understood as a result of a detailed description of the preferred embodiments when taken in conjunction with the accompanying drawings in which.

DETAILED DESCRIPTION OF THE PREFERRED EMBODIMENT

Figure 1:
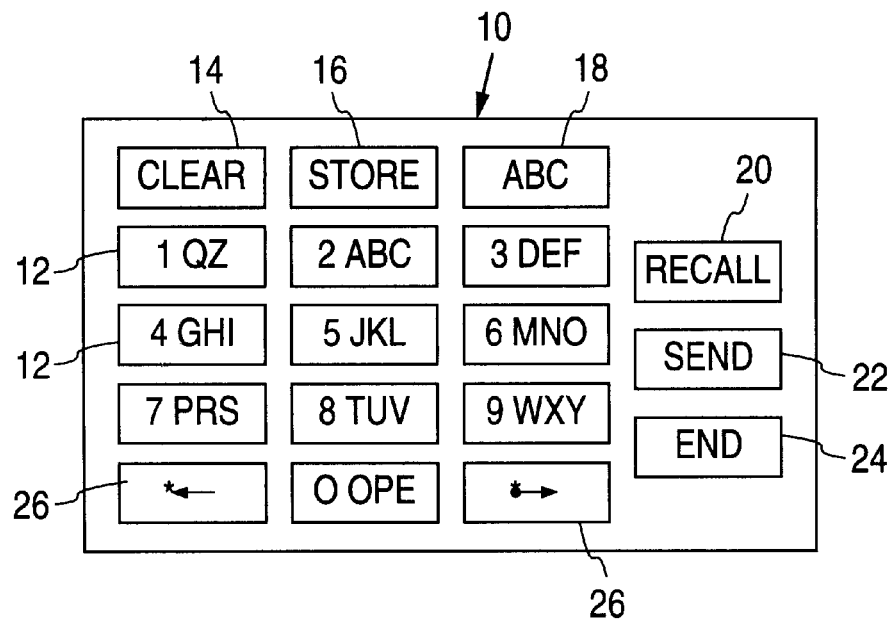
FIG. 1 is a diagram of a conventional mobile phone keypad.

Referring to FIG. 1, a typical keypad 10 of a conventional phone is illustrated. Keypad 10 has both standard alpha/numeric keys 12 which are labeled with numbers and letters, e.g. "2 ABC", etc., and special purpose keys 14 to 24. The special purpose keys, in the example, are permanently labeled as to their functions in English. If this phone is to be sold to a Spanish or French speaking buyer, however, these special purpose keys 14 to 24 will have to either be relabeled or the buyer will have to try to cope with using keys whose functions are not clear from the labels.

Figure 2:
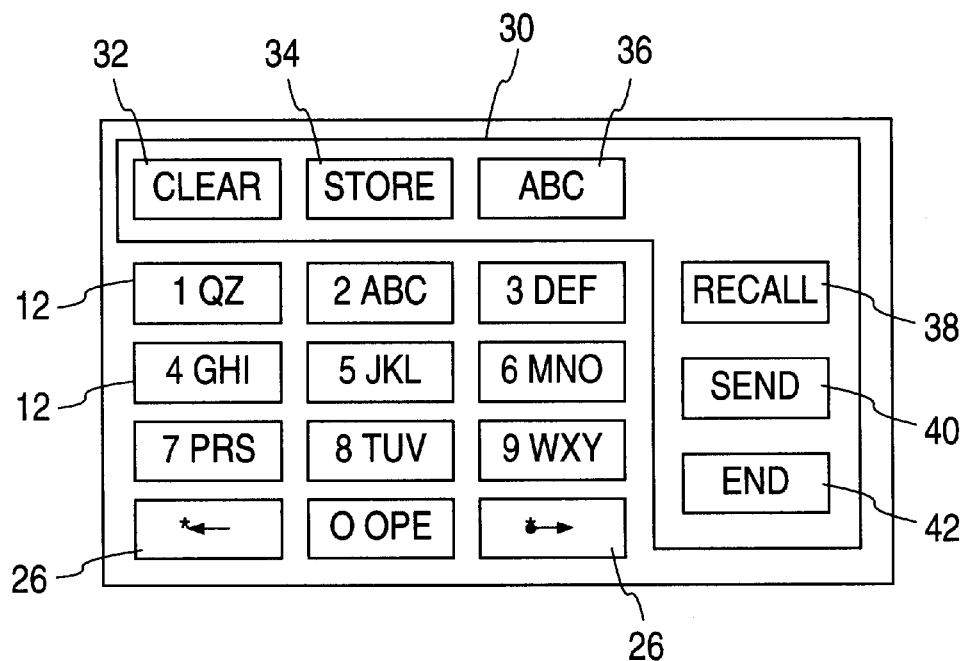
FIG. 2 is a diagram of a mobile phone keypad according to the invention.
Figure 4:
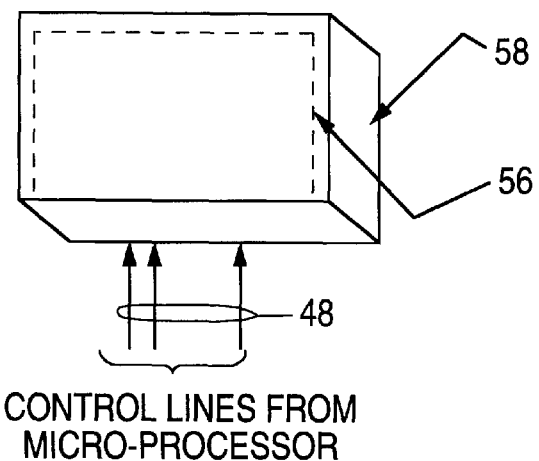
FIG. 4 is an enlarged, perspective view of a key display screen of the key depicted in FIG. 3.

The keypad according to the invention is shown in FIG. 2. It has the same standard alpha/numeric keys 12, selection or "cursor" keys 26, and special function keys 32 to 42, corresponding to keys 14 to 24, respectively. However, keys 32 to 42 each have keybuttons 58 with changeable labels in the form of liquid crystal display (LCD) screens 56, as best seen in FIG. 4. Each screen 56 is capable of displaying a label of the special function of the key in a plurality of different languages.

Figure 3:
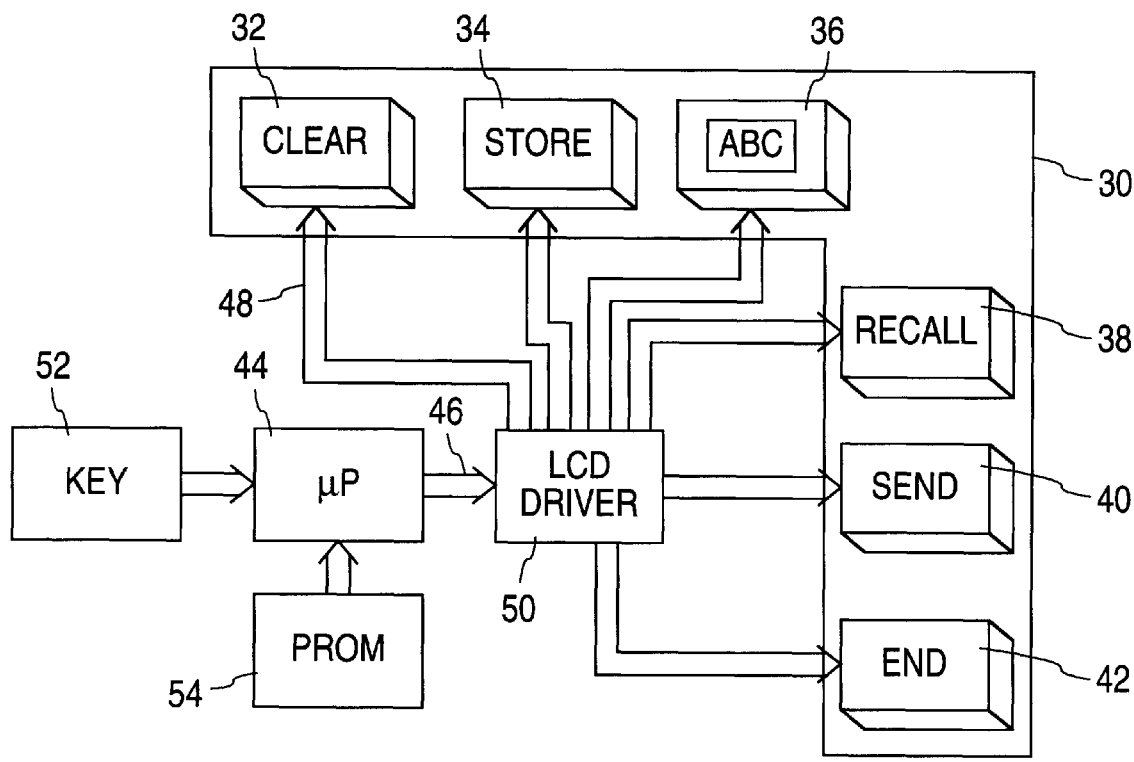
FIG. 3 is a block diagram of a mobile phone keypad according to the invention.

Referring to FIG. 3, a block diagram of the circuit for operating the screen displays 56 is shown. Each special function key 32 to 42 is connected by means of lines 48 to an LCD driver circuit 50. The driver circuit 50 receives its operating signals from a microprocessor 44 via a bus 46. The microprocessor 44 receives inputs from one or more user operated keys, generally labeled 52. Key 52 may also be a special function key which has an LCD display screen 56, but is preferably a selector key 26, for example. The microprocessor is capable of reading screen label display data from a programmed read only memory (PROM) 54. The PROM 54 stores label data in a plurality of different languages for each of the keys 32 to 42.

Although not shown in the figures, the microprocessor 44 is connected to each of the plurality of keys 12–26 and 32–42 for sensing when one of such keys is depressed and controlling a corresponding function of the mobile phone in response thereto. The microprocessor further controls the PROM 54 and the LCD driver 50 to read out display information in a given language from the PROM 54 and supply the read out display information to the LCD driver 50 for displaying labels of a given language on the displays 56 of each of the keybuttons 58.

The microprocessor 44 can be programmed by a user of the mobile phone by depressing one or more of the plurality of keys. More particularly, the microprocessor 44 can be programmed by a user of the mobile phone by depressing one or more of the plurality of keys 12, 26, 36 to display on a general display screen (not shown) language choices for the LCD screens 56 and, in response to a selection of a particular language as indicated by the user depressing one or more of the plurality of keys, to read out the display information in the language selected by the user from the PROM 54 and supply the read out display information to the LCD driver 50. Thus, the selection of the display language can be conveniently done by the phone's manufacturer, distributer, or end user.

One of the plurality of keys having a screen 56 with a changeable label is a "CLEAR" key 32 for causing the mobile phone to erase a number or a series of numbers entered by means of the keys. Another key having a screen 56 with a changeable label is a "STORE" key 34 for causing the mobile phone to store in a memory a number or a series of numbers entered by means of the keys. Another key with a screen 56 is a "RECALL" key 38 for causing the mobile phone to read out from memory a number or a series of numbers previously stored in the memory. Still other keys having a screen 56 with a changeable label are a "SEND" key 40 for causing the mobile phone to dial a number and an "END" key 42 for terminating a call.

A key 36, which is labeled "ABC" in the figures, is for controlling the functions to be served by the alpha/numeric keys 12, i.e. pressing the key 36 causes the microprocessor 44 to recognize depression of one of the keys 12 as an input of an alphabetical character. For example, if the "DEF" key 12 is depressed three times in quick succession, the microprocessor 44 would recognize that an "F" was being entered. This becomes useful in entering stored names to be associated with saved phone numbers in a memory (not shown) in the phone. The key 36 is also equipped with a display screen 56 for correctly labeling this function in any one of multiple languages.

While the preferred embodiment has been described as having individual LCD screens on each key, in other embodiments the entire el-shaped block 30 of special function keys may be a liquid crystal display panel of a known type over which is positioned a switch panel having various X-Y grid patterns of contacts and a flexible cover, all of which are transparent. In operation, the LCD panel displays a function label and the user depresses the portion of the switch panel in registry with the displayed label. This causes two contacts to close and complete the circuit so that the microprocessor 44 recognizes that a "key" has been depressed.

Thus, as described above, a mobile phone keypad according to the present invention includes a plurality of keys 12, 26, 32–42, some having fixed labels 12 thereon for describing a function of the key and others having changeable labels 32–42 thereon for describing a function of the key. Each changeable label includes a liquid crystal display LCD screen 56. Also included are storage means 54 for storing display information in a plurality of different languages for the LCD screens 56, LCD driver means 50 for simultaneously supplying display signals to the LCD screens 56 to cause the LCD screens 56 to display different displays in the same language, and control means 44 connected to each of the plurality of keys 12, 26, 32–42 for sensing when one of such keys 12, 26, 32–42 is depressed and controlling a corresponding function of the mobile phone in response thereto.

The control means 44 further controls the storage means 54 and the LCD driver means 50 to read out display information in a given language from the storage means 54 and supply the read out display information to the LCD driver means 50. The control means 44 can be programmed by a user of the mobile phone by depressing one or more of the plurality of keys 12, 26, 32–42 and can be thereby controlled by the user to read out the display information in a language selected by the user from the storage means 54 and supply the read out display information to the LCD driver means 50.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A mobile phone keypad comprising:

a plurality of keys, some having fixed labels thereon for describing a function of the key and others having changeable labels thereon for describing a function of the key, each changeable label including a liquid crystal display (LCD) screen;

storage means for storing display information in a plurality of different languages for the LCD screens;

LCD driver means for simultaneously supplying display signals to the LCD screens to cause the LCD screens to display different displays in the same language; and control means connected to each of the plurality of keys for sensing when one of such keys is depressed and controlling a corresponding function of the mobile phone in response thereto, the control means further controlling the storage means and the LCD driver means to read out display information in a given language from the storage means and supply the read out display information to the LCD driver means.

2. A mobile phone keypad according to claim 1, wherein the control means can be programmed by a user of the mobile phone by depressing one or more of the plurality of keys and further wherein the control means can be thereby controlled by the user to read out the display information in a language selected by the user from the storage means and supply the read out display information to the LCD driver means.

3. A mobile phone keypad according to claim 1, wherein one of the plurality of keys having a keypad with a changeable label is a "CLEAR" function key for causing the mobile phone to erase a number or a series of numbers entered by means of the keys.

4. A mobile phone keypad according to claim 1, wherein one of the plurality of keys having a keypad with a changeable label is a "STORE" function key for causing the mobile phone to store in a memory a number or a series of numbers entered by means of the keys.

5. A mobile phone keypad according to claim 1, wherein one of the plurality of keys having a keypad with a changeable label is a "RECALL" function key for causing the mobile phone to read out from memory a number or a series of numbers previously stored in the memory.

6. A mobile phone keypad according to claim 1, wherein one of the plurality of keys having a keypad with a changeable label is a "SEND" function key for causing the mobile phone to dial a number.

7. A mobile phone keypad according to claim 1, wherein one of the plurality of keys having a keypad with a changeable label is an "END" function key for causing the mobile phone to disconnect voice communication with another phone via a base station.

8. A mobile phone comprising:

general display screen for displaying various control functions of the mobile phone;

a phone keypad having a plurality of keys, some having fixed labels thereon for describing a function of the key and others having changeable labels thereon for describing a function of the key, each changeable label including a liquid crystal display (LCD) screen;

storage means for storing display information in a plurality of different languages for the LCD screens;

LCD driver means for simultaneously supplying display signals to the LCD screens to cause the LCD screens to display different displays in the same language;

control means connected to the general display screen, for controlling displays thereon, and each of the plurality of keys, for sensing when one of such keys is depressed and controlling a corresponding function of the mobile phone in response thereto, the control means further controlling the storage means and the LCD driver means to read out display information in a given language from the storage means and supply the read out display information to the LCD driver means;

wherein the control means can be programmed by a user of the mobile phone by depressing one or more of the plurality of keys to display on the general display screen language choices for the LCD screens and, in response to a selection of a particular language as indicated by the user depressing one or more of the plurality of keys, to read out the display information in the language selected by the user from the storage means and supply the read out display information to the LCD driver means.

9. A mobile phone comprising:

a phone keypad having a plurality of keys having changeable labels thereon for displaying words describing a function of the key, each changeable label including a liquid crystal display (LCD) screen;

storage means for storing display words in a plurality of different languages for the LCD screens;

LCD driver means for simultaneously supplying display signals to the LCD screens to cause the LCD screens to display different words in the same language; selected from one of the plurality of languages and control means connected to the general display screen, for controlling displays thereon, and each of the plurality of keys, for sensing when one of such keys is depressed and controlling a corresponding function of the mobile phone in response thereto, the control means further controlling the storage means and the LCD driver means to read out display words in a given language from the storage means and supply the read out display words to the LCD driver means.

10. A mobile phone according to claim 9, wherein the control means can be programmed by a user of the mobile phone by depressing one or more of the plurality of keys to display language choices for the LCD screens and, in response to a selection of a particular language as indicated by the user depressing one or more of the plurality of keys, to read out the display words in the language selected by the user from the storage means and supply the read out display words to the LCD driver means.

* * * * *